US008917086B2

(12) United States Patent
Post

(10) Patent No.: US 8,917,086 B2
(45) Date of Patent: Dec. 23, 2014

(54) POSITION SENSOR FOR LINEAR SYNCHRONOUS MOTORS EMPLOYING HALBACH ARRAYS

(75) Inventor: Richard Freeman Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 767 days.

(21) Appl. No.: 13/186,271

(22) Filed: Jul. 19, 2011

(65) Prior Publication Data

US 2012/0019235 A1 Jan. 26, 2012

Related U.S. Application Data

(60) Provisional application No. 61/366,055, filed on Jul. 20, 2010.

(51) Int. Cl.

| | |
|---|---|
| ***G01B 7/14*** | (2006.01) |
| ***H02K 11/00*** | (2006.01) |
| ***H02K 41/03*** | (2006.01) |
| ***B60L 13/06*** | (2006.01) |
| ***G01B 7/00*** | (2006.01) |

(52) U.S. Cl.

CPC ............ *G01B 7/003* (2013.01); *H02K 11/0021* (2013.01); *H02K 41/031* (2013.01); *B60L 13/06* (2013.01); *B60L 2220/14* (2013.01)

USPC ............... 324/207.13; 324/207.22; 324/207.2

(58) Field of Classification Search

USPC ........................... 234/207.2, 207.11–207.13, 234/207.21–207.24

See application file for complete search history.

(56) References Cited

U.S. PATENT DOCUMENTS

| | | | | |
|---|---|---|---|---|
| 3,731,184 | A | 5/1973 | Goldberg et al. | |
| 4,670,715 | A * | 6/1987 | Fuzzell | 324/207.2 |
| 4,745,363 | A * | 5/1988 | Carr et al. | 324/207.2 |
| 5,708,427 | A | 1/1998 | Bush | |
| 6,060,880 | A * | 5/2000 | Guyot et al. | 324/207.2 |
| 6,127,821 | A * | 10/2000 | Ramsden et al. | 324/202 |
| 6,452,504 | B1 | 9/2002 | Seal | |
| 6,633,217 | B2 * | 10/2003 | Post | 335/306 |
| 6,661,335 | B1 | 12/2003 | Seal | |
| 6,690,159 | B2 * | 2/2004 | Burreson et al. | 324/207.23 |
| 6,812,842 | B2 | 11/2004 | Dimmer | |
| 6,906,528 | B2 | 6/2005 | Post | |
| 8,616,134 | B2 | 12/2013 | King et al. | |
| 2002/0186033 | A1 * | 12/2002 | Smith et al. | 324/763 |
| 2003/0142073 | A1 | 7/2003 | Fukushima et al. | |
| 2006/0103376 | A1 * | 5/2006 | Ma | 324/207.24 |
| 2006/0164074 | A1 * | 7/2006 | Andrieu et al. | 324/207.13 |
| 2007/0126418 | A1 * | 6/2007 | Dufour et al. | 324/207.24 |
| 2007/0200564 | A1 * | 8/2007 | Motz et al. | 324/247 |

* cited by examiner

*Primary Examiner* — Thanh Lam

(74) *Attorney, Agent, or Firm* — John P. Wooldridge

(57) ABSTRACT

A position sensor suitable for use in linear synchronous motor (LSM) drive systems employing Halbach arrays to create their magnetic fields is described. The system has several advantages over previously employed ones, especially in its simplicity and its freedom from being affected by weather conditions, accumulated dirt, or electrical interference from the LSM system itself.

15 Claims, 5 Drawing Sheets

10
14
12
Sensor magnet
Halbach arrays

POSITION SENSOR FOR LINEAR SYNCHRONOUS MOTORS EMPLOYING HALBACH ARRAYS

This application claims priority to U.S. Provisional No. 61/366,055, titled "Position Sensor For Linear Synchronous Motors Employing Halbach Arrays," filed Jul. 20, 2010, incorporated herein by reference.

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to linear synchronous motors, and more specifically, it relates to the detection of phasing of a linear synchronous motor.

2. Description of Related Art

Linear synchronous motor (LSM) drive systems, such as those employed on magnetic levitation trains utilizing Halbach arrays, are well known in the art and employ multi-phase AC or pulsed windings in the track interacting with permanent-magnet assemblies on the moving vehicle to produce propulsion or dynamic braking. In order for the LSM drive to function, it is necessary that the location of the Halbach array with respect to the windings be known at all times within a small fraction of the wavelength of the Halbach arrays. This information is then fed to the drive circuitry to control its output as a function of time. In the past, various techniques to accomplish this end have been used. These include the use of optical position sensing systems employing lasers and photocells on the moving vehicle and a strip with alternating black and white bands embedded in the track. Alternatively, to determine the position, special windings are embedded in the track that receive a radio signal from a compact radiator on the moving vehicle. Neither of these system types is totally satisfactory. The optical system suffers from the effects of dirt (or, in the winter, snow) on its banded strip, and the radio system is subject to interference from the high-current drive pulses in the LSM track windings.

SUMMARY OF THE INVENTION

The invention provides sensor including permanent magnet material and one or more load cells located in a weather proof container. One or more of the sensors are placed along a linear synchronous motor (LSM) drive system such that they are immersed in the magnetic fields produced by Halbach arrays mounted on a moving vehicle travelling on the track of the LSM drive system. The sensors will operate without environmental degradation from the presence of snow or normal accumulation of dust or dirt. Electrical shielding renders the sensors insensitive to electrical interference created by high-frequency noise sources. By locating the sensors in short gaps in the LSM windings, periodically spaced at intervals along the track, they are not negatively influenced by the magnetic fields from these windings.

Embodiments provide dual Halbach arrays which together produce additive transverse fields. The sensor magnet system is located on the LSM and is placed so that it is acted upon by the fields produced by the Halbach array. The permanent magnet moves as it is passed by the field. The moving magnet changes the force on the load cell, and this results in a measurable electrical signal. For sensor magnets whose longitudinal dimensions are small compared to a quarter-wavelength of the Halbach arrays, the net longitudinal force on the magnet is proportional to the first derivative of the transverse magnetic field at the sensor.

Stable (phase-locked) acceleration and propulsion action of the LSM requires that the current in the windings should be phased to coincide with regions of the field where the field gradient is positive and the polarity of the field is such as to create a forward-going force. Thus, the LSM controller system would be programmed to sense the position of the Halbach array from the data obtained from the position-sensor magnets and react accordingly. In some cases it is advantageous to employ an assembly of two or more sensor magnets, separated longitudinally by a fraction of a wavelength. Such a combination offers more opportunities for data-processing of the signals from the sensors. For example, if the LSM employs 3-phase windings, three sensors could be employed, separated from each other by 120° (one-third of a wavelength). In this case the outputs of the sensors could be used to control the timing of the current pulses in the three windings in synchronism with the motion of the propelled object. The output to the controller from the three sensors could also be made to be independent of the signal level from the sensors by dividing their output by the rms value obtained by squaring each signal and taking the square-root of the sum of these values.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The concept involved in this invention involves the sensing of forces exerted on "sensor" permanent magnets associated with the immersion of these sensor magnets in the magnetic fields produced by the LSM Halbach arrays mounted on the moving vehicle. The sensing can be accomplished by the use of conventional electronic "load cells," e.g., of the type employed in electronic scales. Sealed inside weather-proof cans (e.g., ones made of thin stainless steel), the sensors will operate without degradation from the presence of snow or normal accumulation of dust or dirt. In addition, with the electrical shielding afforded by the cans, the sensors can be made to be insensitive to electrical interference created by high-frequency noise sources. Also, by locating them in short gaps in the LSM windings, periodically spaced at intervals along the track, they will not be adversely influenced by the magnetic fields from these windings.

Figure 1A:
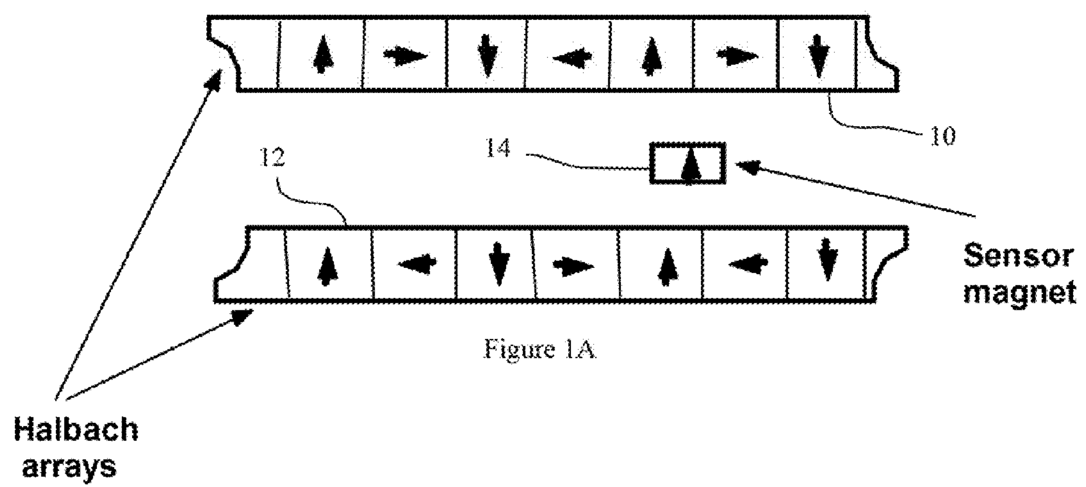
FIG. 1A is a schematic top view of a magnetic position sensor for a linear synchronous motor (LSM).
Figure 1B:
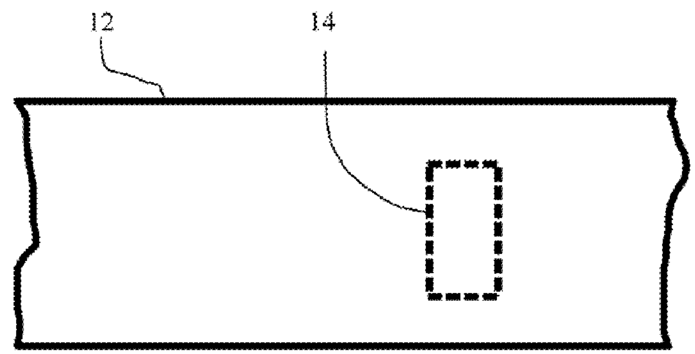
FIG. 1B is a side view of the position sensor of FIG. 1A.

FIG. 1A shows a schematic top view drawing of a system where dual Halbach arrays 10 and 12 which together produce additive transverse fields. In this system, the sensor magnet system measures the longitudinally directed forces that are exerted on them. As shown schematically, the sensor magnet 14 is in the form of a rectangular parallelepiped, polarized in a direction perpendicular to its sideward-facing faces. For magnets polarized in this way, the Amperian currents flow around the edges of the magnet, i.e., vertically (on the left and right surfaces of the sensor magnet as shown in the side view of FIG. 1B) and longitudinally (i.e., right or left) in FIG. 1A. FIG. 1B shows a side view of the system of FIG. 1A The longitudinal component of the j×B Lorentz force is the one that is utilized to sense the position of the moving Halbach arrays.

Figure 2:
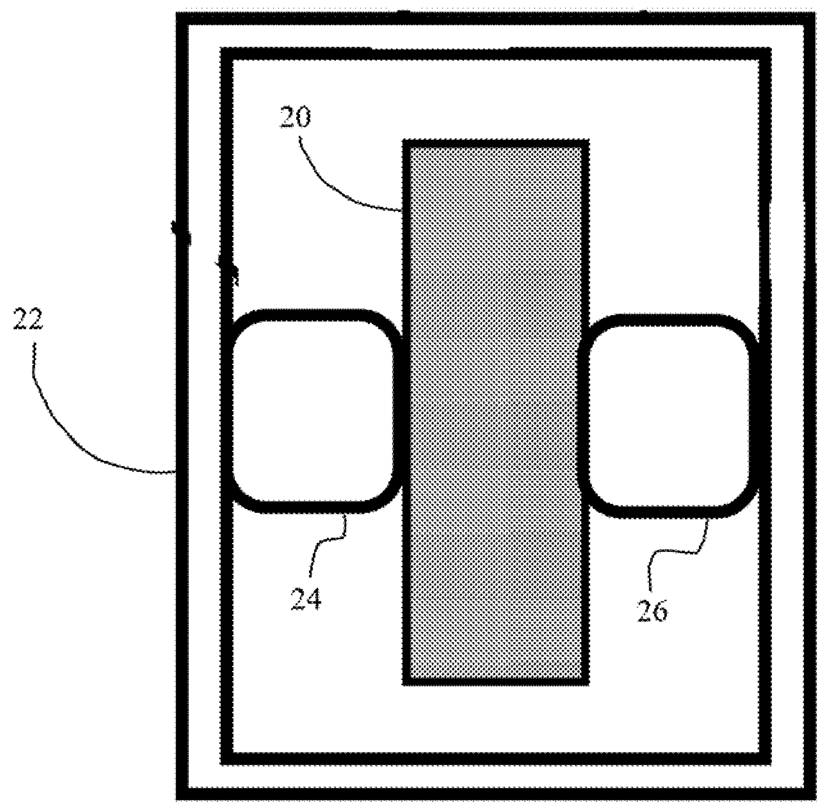
FIG. 2 is a drawing of a sensor magnet, load cells and support structure.

FIG. 2 shows a schematic drawing of an embodiment sensor according to the present invention. Magnet 20 is mounted support structure 22 which also contains load cells 24 and 26. For sensor magnets whose longitudinal dimensions are small compared to a quarter-wavelength of the Halbach arrays, the net longitudinal force on the magnet is proportional to the first derivative of the transverse magnetic field at the sensor. Note that the peak values of the forces are large, of order tens of kilograms, making it easy to detect and measure them using commercial load cells.

Figure 3A:
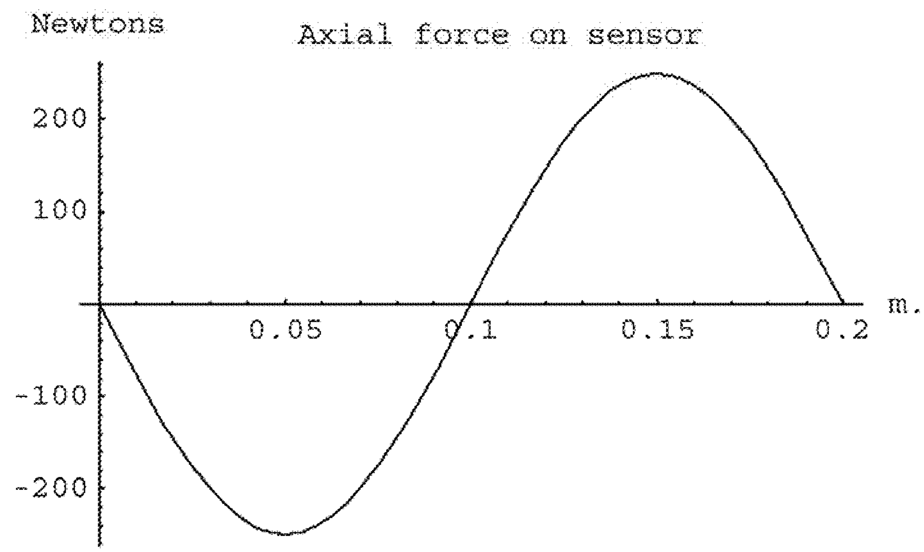
FIG. 3A is plot of force on a sensor.
Figure 3B:
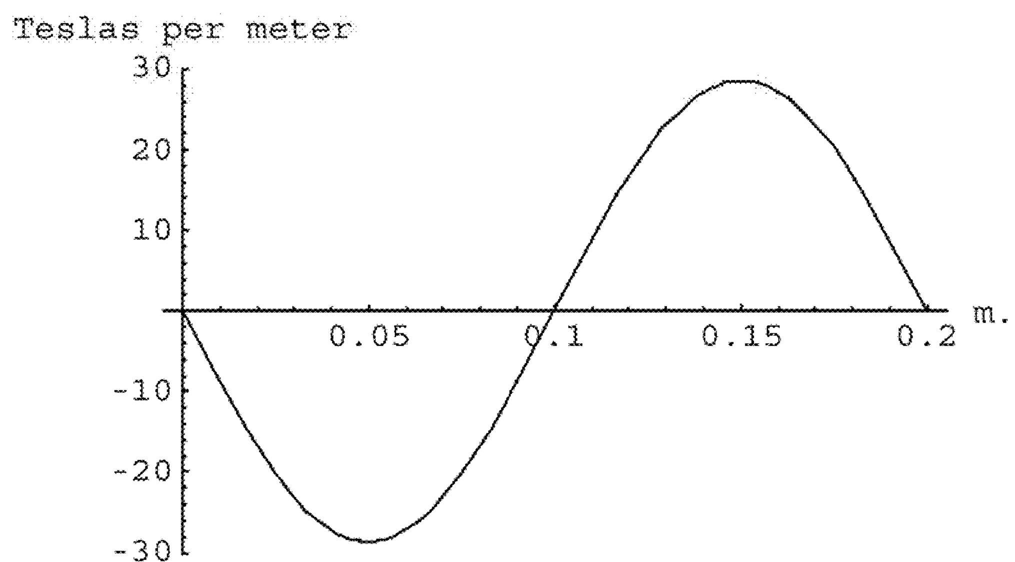
FIG. 3B shows the first derivative of a transverse field of Halbach arrays.

For comparison, FIG. 3A shows the calculated longitudinal force and FIG. 3B shows the first derivative of the transverse magnetic field with respect to longitudinal position (x), for a dual Halbach array having a wavelength of 0.2 meters. Note that for all of the calculations to be presented here, the permanent-magnet material that was used for both the Halbach arrays and the sensors was NeFeB with a remanent field of 1.4 Tesla. For this case the longitudinal dimension of the sensor magnet was 0.0125 m., as was its transverse dimension. Its length in the vertical direction was 0.05 meters. As can be seen, the force on the sensor magnet has a spatial variation that closely parallels the shape of the plot of the first derivative.

Figure 4:
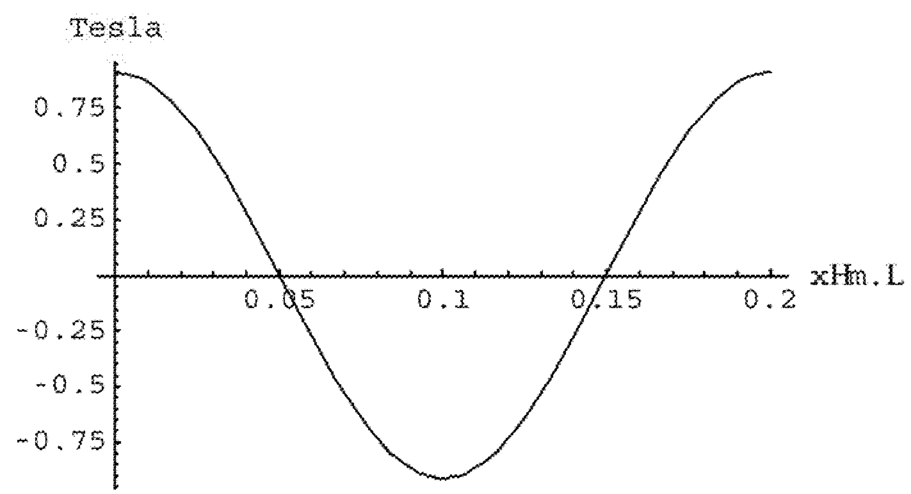
FIG. 4 is a plot of the strength of the transverse field of dual Halbach array.

FIG. 4 is a plot of the transverse component of the magnetic field at the midplane between the arrays. Stable (phase-locked) acceleration and propulsion action of the LSM requires that the current in the windings should be phased to coincide with regions of the field where the field gradient is positive and the polarity of the field is such as to create a forward-going force. On the plots of FIGS. 3A, 3B and 4, such a region is seen to lie between x=0.15 m and x=0.2 m, repeated with a periodicity of one wavelength along the LSM windings Thus, the LSM controller system would be programmed to sense the position of the Halbach array from the data obtained from the position-sensor magnets and react accordingly.

Figure 5:
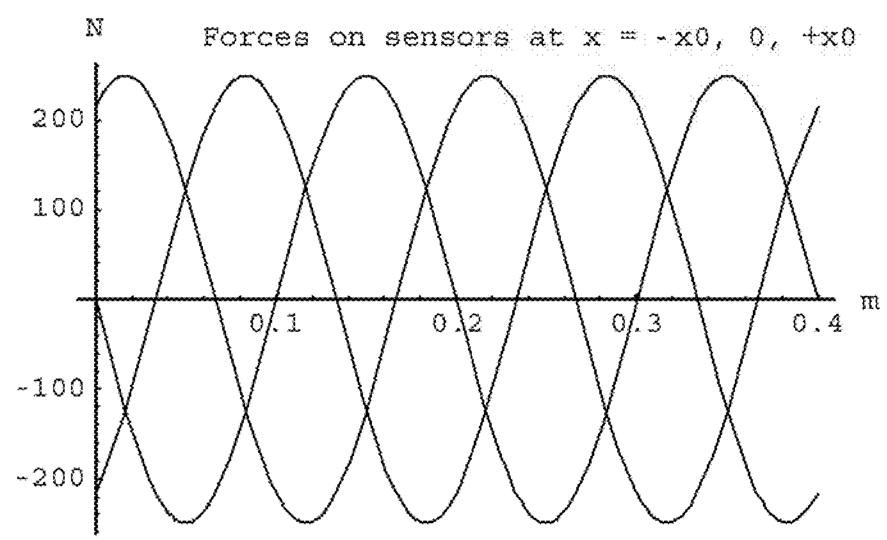
FIG. 5 shows a plot of the superposition of the forces on a 3-phase sensor array with spacing of 120° in phase between the sensors.
Figure 6:
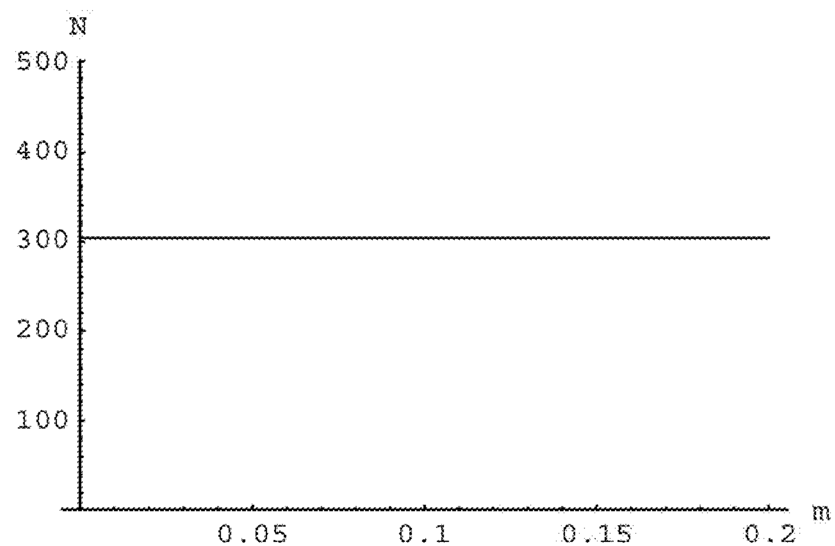
FIG. 6 shows the RMS value of forces on a 3-phase sensor array (i.e., the square root of sum of squares of signals from the three sensors).

In some cases it is advantageous to employ an assembly of two or more sensor magnets, separated longitudinally by a fraction of a wavelength. Such a combination offers more opportunities for data-processing of the signals from the sensors. For example, if the LSM employs 3-phase windings, three sensors could be employed, separated from each other by 120° (one-third of a wavelength). In this case the outputs of the sensors could be used to control the timing of the current pulses in the three windings in synchronism with the motion of the propelled object. The plots in FIG. 5 are a superposition of the signals from the three sensors for such a case. The output to the controller from the three sensors could also be made to be independent of the signal level from the sensors by dividing their output by the rms value obtained by squaring each signal and taking the square-root of the sum of these values. This quantity is independent of position, as shown in the plot of FIG. 6. Dividing the signal levels by this value in the data-processor would allow a precision determination of phase location of the Halbach arrays, using the thus-normalized values of the sensor signals.

Finally, the position sensor system that has been described could also be used to provide a continuous "locater" function in that each of the sensors located periodically along the track would give a signal if and only if it sensed the presence of a Halbach array.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
at least one sensor comprising:
a housing;
a load cell fixedly attached to an inner portion of said housing; and
a permanent magnet movably positioned within said housing and in contact with said load cell such that movement of said magnet will deform said load cell such that a signal will be produced by said load cell.

2. The apparatus of claim 1, wherein when said permanent magnet is within a magnetic field that causes said permanent magnet to move relative to said load cell, said signal will be produced by said load cell.

3. The apparatus of claim 1, wherein said housing is weather-proof.

4. The apparatus of claim 1, wherein said housing comprises a material that is resistant to electrical interference.

5. The apparatus of claim 1, wherein said housing comprises material that is resistant to electromagnetic interference.

6. The apparatus of claim 1, wherein said housing comprises metal.

7. The apparatus of claim 1, wherein said housing comprises stainless steel.

8. The apparatus of claim 1, wherein further comprising a second load cell attached to an inner portion of said housing and in contact with said permanent magnet.

9. The apparatus of claim 1, wherein said load cell comprises a strain-gauge load cell.

10. The apparatus of claim 1, further comprising a linear synchronous motor (LSM) comprising a plurality of windings and a gap between each winding and its neighboring winding of said plurality of windings, wherein a sensor of said at least one sensor is fixed within each said gap.

11. The apparatus of claim 10, further comprising a track along said LSM, wherein each said sensor is separated from another said sensor by a fraction of a wavelength of a Halbach array that is in movable on said track.

12. The apparatus of claim 1, wherein said windings comprise 3-phase windings, wherein said at least one sensor comprises three sensors separated from each other by one-third of a wavelength of said Halbach array.

13. A position sensor for a linear synchronous motor, comprising:

a linear synchronous motor drive system comprising a track with windings;

a plurality of sensors, wherein each sensor of said sensors is fixedly located relative to said drive system, wherein said each sensor comprises:

a housing;

a load cell fixedly attached to an inner portion of said housing; and a permanent magnet movably positioned within said housing, wherein when said permanent magnet is within a magnetic field that causes said permanent magnet to move relative to said load cell, a signal will be produced by said load cell, wherein each sensor of said sensors is periodically located at a separate place relative to said windings;

means for reading said signal produced by each said sensor and determining which said sensor produced said signal to produce a sensor location signal; and means for using said location signal to control the operation of said linear synchronous motor drive system.

14. The sensor of claim 13, further comprising a movable vehicle in movable contact with said track and configured to move along said track, wherein said movable vehicle comprises Halbach array fixedly attached to said movable vehicle.

15. A method for sensing the position of a moving vehicle on a linear synchronous motor track, comprising:

providing a linear synchronous motor drive system comprising a track with windings;

providing a plurality of sensors, wherein each sensor of said sensors is fixedly located relative to said drive system, wherein said each sensor comprises:

a housing;

a load cell fixedly attached to an inner portion of said housing; and a permanent magnet movably positioned within said housing, wherein when said permanent magnet is within a magnetic field that causes said permanent magnet to move relative to said load cell, a signal will be produced by said load cell, wherein each sensor of said sensors is periodically located at a separate place relative to said windings;

providing means for reading said signal produced by each said sensor and determining which said sensor produced said signal to produce a sensor location signal;

providing means for using said location signal to control the operation of said linear synchronous motor drive system;

providing a movable vehicle in movable contact with said track and configured to move along said track, wherein said movable vehicle comprises a Halbach array fixedly attached to said movable vehicle, wherein said Halbach array produces a magnetic field;

moving said movable vehicle along said track, wherein said Halbach array produced magnetic field interacts with a particular sensor of said sensors, wherein said particular sensor produces said sensor location signal;

reading said signal produced by each said sensor and determining which said sensor produced said signal to produce a sensor location signal; and using said location signal to control the operation of said linear synchronous motor drive system.

* * * * *